US009036616B2

(12) United States Patent
Sundararajan et al.

(10) Patent No.: US 9,036,616 B2
(45) Date of Patent: May 19, 2015

(54) SYNCHRONIZING GENERATION AND TRANSMISSION OF KEEP-ALIVE MESSAGES

(71) Applicant: Qualcomm Incorporated, San Diego, CA (US)

(72) Inventors: Jay Kumar Sundararajan, San Diego, CA (US); Arnaud Meylan, San Diego, CA (US); David Charles Sainte-Claire, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 13/750,845

(22) Filed: Jan. 25, 2013

(65) Prior Publication Data
US 2014/0211764 A1 Jul. 31, 2014

(51) Int. Cl.
*H04J 3/06* (2006.01)
*H04W 56/00* (2009.01)
*H04W 76/04* (2009.01)
*H04L 12/26* (2006.01)
*H04W 88/02* (2009.01)

(52) U.S. Cl.
CPC .......... *H04W 56/00* (2013.01); *H04W 56/0025* (2013.01); *H04L 43/00* (2013.01); *H04W 76/045* (2013.01); *H04W 88/02* (2013.01)

(58) Field of Classification Search
None
See application file for complete search history.

(56) References Cited

U.S. PATENT DOCUMENTS

| 7,693,084 | B2 | 4/2010 | Herzog |
| 7,729,357 | B2 | 6/2010 | Strater et al. |
| 8,065,419 | B2 | 11/2011 | Vimpari et al. |
| 8,285,200 | B2 | 10/2012 | Backholm et al. |
| 2004/0264381 | A1* | 12/2004 | Banerjee et al. ............. 370/252 |
| 2009/0319670 | A1 | 12/2009 | Kang |
| 2010/0208719 | A1* | 8/2010 | Buttles .......................... 370/345 |
| 2012/0239817 | A1 | 9/2012 | Ensing et al. |

FOREIGN PATENT DOCUMENTS

| EP | 2088714 A1 | 8/2009 |
| WO | WO-2012174006 A1 | 12/2012 |

OTHER PUBLICATIONS

ISA/EPO, International Search Report and Written Opinion of the International Searching Authority, Int'l App. No. PCT/US2014/012272, Jul. 25, 2014, European Patent Office, Rijswijk, NL, 11 pgs.
IPEA/EPO, Second Written Opinion of the International Preliminary Examining Authority, Int'l. App. No. PCT/US2014/012272, Jan. 23, 2015, European Patent Office, Berlin, DE, 6 pgs.

* cited by examiner

*Primary Examiner* — Khoa Huynh
(74) *Attorney, Agent, or Firm* — Holland & Hart LLP

(57) ABSTRACT

Methods, systems, and devices are described for generating keep-alive messages for a plurality of persistent connections. The plurality of persistent connections associated with at least one application on a wireless device in a network hosting the plurality of persistent connections are identified. A timing schedule specific to the network to transmit keep-alive messages to refresh each persistent connection of the plurality of persistent connections is identified. A generation of the keep-alive messages for each persistent connection of the plurality of persistent connections is synchronized. The synchronized generation of the keep-alive messages occurs according to the identified timing schedule of the network.

39 Claims, 12 Drawing Sheets

SYNCHRONIZING GENERATION AND TRANSMISSION OF KEEP-ALIVE MESSAGES

BACKGROUND

The following relates generally to wireless communication, and more specifically to the generation of keep-alive messages to maintain persistent connections. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. An application installed on a mobile device may establish a network connection over a wireless communication system. Keep-alive messages may be sent at certain time intervals to keep the network connection open. If multiple network connections are open, the mobile device may establish a radio connection a number of different times to transmit keep-alive messages for each connection. The establishment of multiple radio connections uses additional resources and power of the mobile device as well as additional network resources for signaling related to setting up and maintaining the connections.

SUMMARY

The described features generally relate to one or more improved systems, methods, and/or apparatuses for synchronizing the generation of keep-alive messages for a number of persistent connections. In one embodiment, multiple persistent connections may be established by one or more applications on a mobile device. Keep-alive messages for the connections may be created and transmitted in a synchronized manner according to a keep-alive time interval of the network hosting the connections. A single radio connection may be established to transmit the keep-alive messages for the various connections. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

A method for generating keep-alive messages for a plurality of persistent connections is described. The plurality of persistent connections associated with at least one application on a wireless device in a network hosting the plurality of persistent connections may be identified. A timing schedule specific to the network to transmit keep-alive messages to refresh each persistent connection of the plurality of persistent connections may be identified. A generation of the keep-alive messages for each persistent connection of the plurality of persistent connections may be synchronized. The synchronized generation of the keep-alive messages may occur according to the identified timing schedule of the network.

Synchronizing the generation of the keep-alive messages may include generating a keep-alive message for at least one persistent connection before a time indicated by the identified timing schedule. A first persistent connection of the plurality of persistent connections may originate from a first entity. A first keep-alive message to refresh the first persistent connection may originate from a second entity. The second entity may be different from the first entity.

In one configuration, a first persistent connection may be established between a first device and a second device in the network. A query may be transmitted after a first time period to determine whether the first persistent connection is available. The timing schedule to transmit the keep-alive messages to refresh persistent connections in the network may be identified based at least in part on the determination as to whether the first persistent connection is available.

In one configuration, upon determining the first persistent connection is unavailable after the first time period, a second persistent connection may be established between the first device and the second device in the network. A query may be transmitted after a second time period to determine whether the second persistent connection is available. In some configurations, the second time period may be shorter than the first time period. Upon determining the first persistent connection is available after the first time period, an additional query may be transmitted after a second time period to determine whether the first persistent connection is available. In some configurations, the second time period may be longer than the first time period.

In some embodiments, the query to determine whether the first persistent connection is available originates from a modem processor or an application processor. Identifying the timing schedule may include identifying a network identifier (ID) of the network and querying a central database for timeout information of persistent connections established in the network. The query may be based at least in part on the network ID. Identifying the timing schedule may include determining whether the timeout information for persistent connections in the network exists in the central database.

Upon determining that the timeout information exists in the central database, the timing schedule to transmit the keep-alive messages to refresh the plurality of persistent connections in the network may be identified. The timing schedule may be based at least in part on the timeout information. Information identifying the identified timing schedule may be stored in a central database. The information may include an identifier (ID) of the network.

In some configurations, the keep-alive messages to refresh the plurality of persistent connections may be transmitted over a single radio connection according to the identified time schedule. The keep-alive messages may originate from a modem processor or an application processor. In some embodiments, the network may include a wireless local area network (WLAN) or a cellular network. In some configurations, a persistent connection of the plurality of persistent connections may include a transmission control protocol (TCP) connection or a user datagram protocol (UDP) connection.

A wireless device configured to generate keep-alive message for a plurality of persistent connections is also described. The wireless device may include a processor, memory in electronic communication with the process, and instructions stored in the memory. The instructions may be executable by the processor to identify the plurality of persistent connections associated with at least one application on a wireless device in a network hosting the plurality of persistent connections. The instructions may be executable by the processor to identify a timing schedule specific to the network to transmit keep-alive messages to refresh each persistent connection of the plurality of persistent connections and synchronize a generation of the keep-alive messages for each persistent connection of the plurality of persistent connections. The synchronized generation of the keep-alive messages may occur according to the identified timing schedule of the network.

An apparatus to generate keep-alive messages for a plurality of persistent connections is also described. The apparatus may include means for identifying the plurality of persistent connections associated with at least one application on a wireless device in a network hosting the plurality of persistent connections. The apparatus may include means for identifying a timing schedule specific to the network to transmit keep-alive messages to refresh each persistent connection of the plurality of persistent connections and means for synchronizing a generation of the keep-alive messages for each persistent connection of the plurality of persistent connections. The synchronized generation of the keep-alive messages may occur according to the identified timing schedule of the network.

A computer program product for generating keep-alive messages for a plurality of persistent connections is also described. The computer program product may include a non-transitory computer-readable medium storing instructions executable by a processor to identify the plurality of persistent connections associated with at least one application on a wireless device in a network hosting the plurality of persistent connections. The instructions may be executable by the processor to identify a timing schedule specific to the network to transmit keep-alive messages to refresh each persistent connection of the plurality of persistent connections and synchronize a generation of the keep-alive messages for each persistent connection of the plurality of persistent connections. The synchronized generation of the keep-alive messages may occur according to the identified timing schedule of the network.

BRIEF DESCRIPTION OF THE DRAWINGS

A further understanding of the nature and advantages of some embodiments of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Internet protocol (IP) hosts may be separated by stateful middleboxes which perform functions such as firewalling and network address translation (NAT). NATs may be deployed on a cellular network, local-area network (LAN), and wireless LAN (WLAN). A network state may be maintained until a keep-alive timer expires. If a long-lived connection (e.g., a persistent connection) such as transmission control protocol (TCP) or user datagram protocol (UDP) is used, a mobile device may ensure the middlebox maintains the network state to keep the connection open. Otherwise, if the keep-alive timer expires, the middlebox may clear the state, resulting in the long-lived connection failing, as the middlebox will drop packets that do not correspond to a remembered state. The mobile device may generate keep-alive messages to transmit to the middlebox to maintain a persistent connection. In some embodiments, multiple persistent connections may be established by at least one application. Keep-alive messages for these connections may be synchronously generated in a transmission. By synchronizing the generation and transmission of these messages, these messages may be transmitted to the middlebox of the network over a single radio connection. This allows the mobile device to conserve resources and reduce traffic over the network hosting the long-lived connections.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
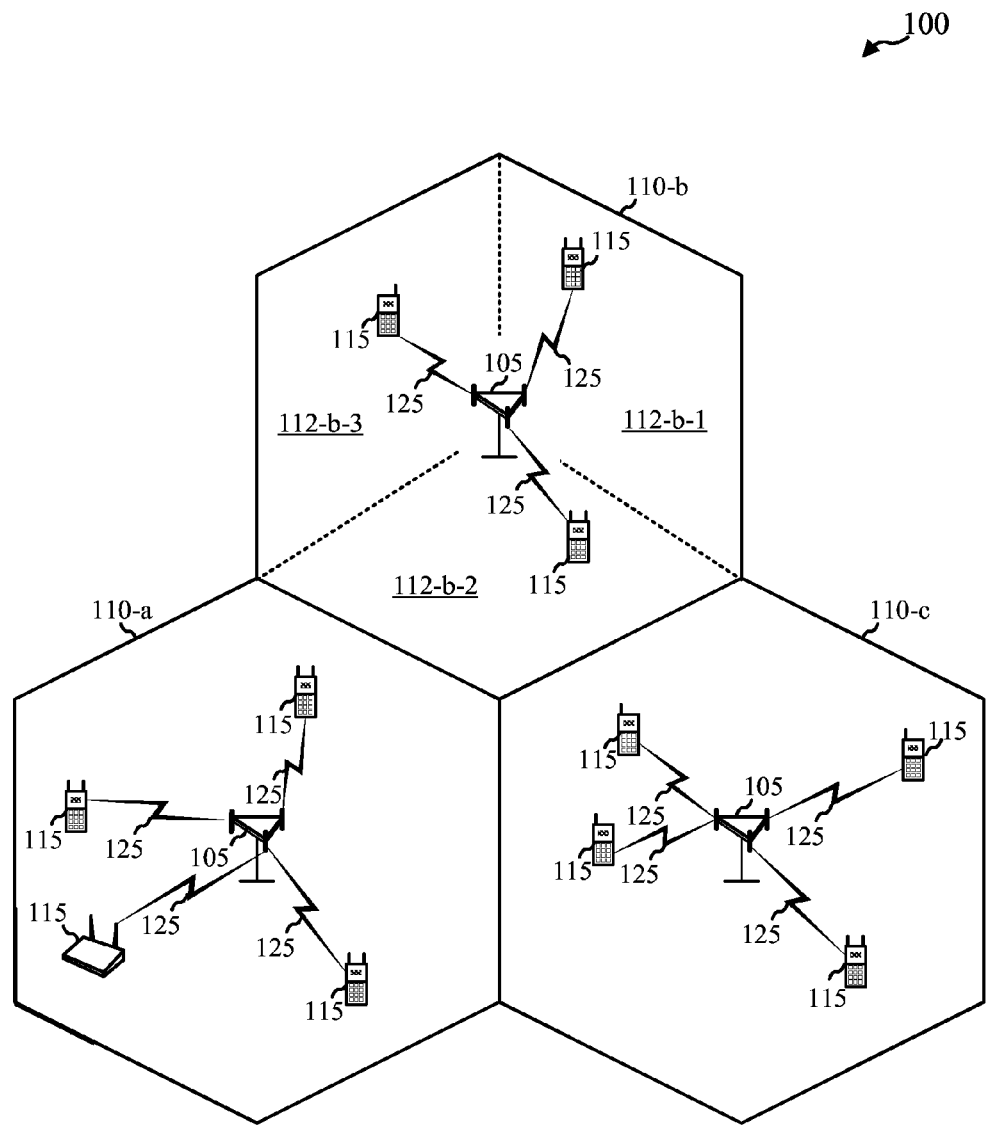
FIG. 1 is a block diagram of a wireless communications system.
Figure 1:
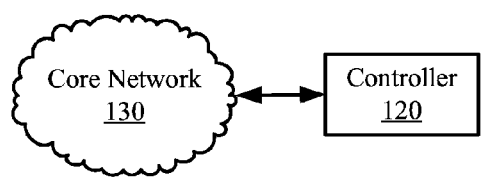

Referring first to FIG. 1, a block diagram illustrates an example of a wireless communications system 100. The system 100 includes base stations 105 (or cells), communication devices 115, a base station controller 120, and a core network 130 (the controller 120 may be integrated into the core network 130). The system 100 may support operation on multiple carriers (waveform signals of different frequencies). Multi-carrier transmitters can transmit modulated signals simultaneously on the multiple carriers. For example, each modulated signal may be a multi-carrier channel modulated according to the various radio technologies described herein. Each modulated signal may be sent on a different carrier and may carry control information (e.g., pilot signals, control channels, etc.), overhead information, data, etc. The system 100 may be a multi-carrier LTE network capable of efficiently allocating network resources.

The base stations 105 may wirelessly communicate with the devices 115 via a base station antenna. The base stations 105 may communicate with the devices 115 under the control of the base station controller 120 via multiple carriers. Each of the base station 105 sites may provide communication coverage for a respective geographic area. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area for each base station 105 here is identified as 110-a, 110-b, or 110-c. The coverage area for a base station may be divided into sectors making up only a portion of the coverage area (e.g., sectors 112-b-1, 112-b-2, 112-b-3, etc.). The system 100 may include base stations 105 of different types (e.g., macro, micro, and/or pico base stations). There may be overlapping coverage areas for different technologies. A macro base station may provide communication coverage for a relatively large geographic area (e.g., 35 km in radius). A pico base station may provide coverage for a relatively small geographic area (e.g., 12 km in radius), and a femto base station may provide communication coverage for a relatively smaller geographic area (e.g., 50 m in radius). There may be overlapping coverage areas for different technologies.

The devices 115 may be dispersed throughout the coverage areas 110. Each device 115 may be stationary or mobile. In one configuration, the devices 115 may be able to communicate with different types of base stations such as, but not limited to, macro base stations, pico base stations, and femto base stations, via link 125. The devices 115 may be referred to as mobile stations, mobile devices, access terminals (ATs), user equipments (UEs), subscriber stations (SSs), or subscriber units. The devices 115 may include cellular phones and wireless communications devices, but may also include personal digital assistants (PDAs), other handheld devices, netbooks, notebook computers, tablet computers, etc.

In one example, the network controller 120 may be coupled to a set of base stations and provide coordination and control for these base stations 105. The controller 120 may communicate with the base stations 105 via a backhaul (e.g., core network 130). The base stations 105 may also communicate with one another directly or indirectly and/or via wireless or wireline backhaul.

In accordance with some embodiments, the wireless communications system 100 may implement a keep-alive messaging system. A keep-alive message may be associated with a long-lived connection, or persistent connection (e.g., TCP, UDP) established by a device 115. A keep-alive message enables a device 115 to keep a persistent connection open with another device (e.g., a back-end server). For example, a device 115 may send a request to a server over a link 125 to open a persistent connection. The base station 105 may transmit the request to the server. The server may reply to the request from the device 115 and establish the persistent connection with the device 115. The device 115 may transmit keep-alive messages at certain time intervals to keep the persistent connection active.

Different networks that are used by persistent connections may have different timing schedules for how often keep-alive messages should be sent to maintain the connections. Devices 115 may not know the keep-alive timing schedule for the network that is hosting a persistent connection. Thus, devices 115 may send keep-alive messages more frequently than is needed in order to refresh connections causing increased battery drain for the devices 115, data usage for the device users, and additional traffic over the network. The present systems and methods may identify a keep-alive timing schedule for a network hosting a persistent connection. In addition, the present systems and methods may synchronize a generation of a number of keep-alive messages for a number of persistent connections on behalf of at least one application that opened the connections. Multiple keep-alive messages may be transmitted over a single radio connection to further conserve resources of the device 115.

Figure 2:
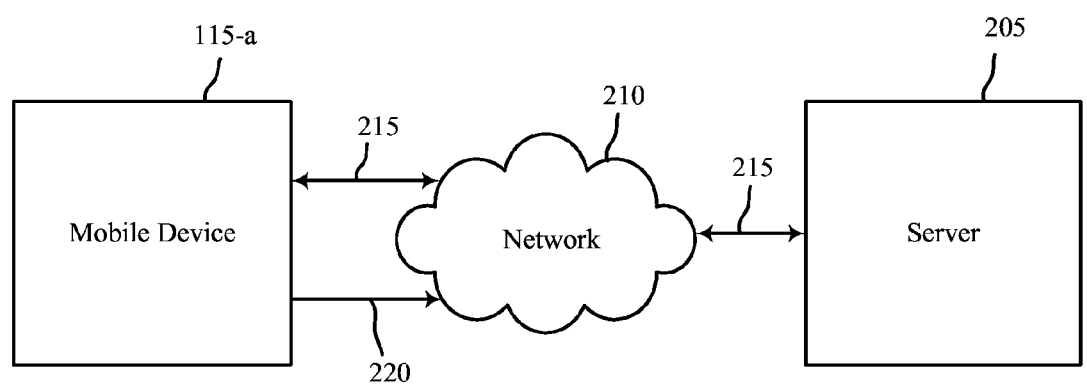
FIG. 2 is a block diagram of an exemplary wireless communications system that includes an example of a device, in accordance with the present systems and methods.

FIG. 2 is a block diagram of an exemplary wireless communications system 200, in accordance with the present systems and methods. A mobile device 115-a may communicate with a server 205 across a network 210. The mobile device 115-a may be an example of the device 115 depicted in FIG. 1. One example of the server 205 may include a server in a TCP and/or UDP network. Thus, the depicted network 210 may include a TCP and/or a UDP network. Additionally or alternatively, the network 210 may include a WLAN and/or a cellular network. In one configuration, the server 205 may provide a crowd-sourcing access functionality, where a device 115-a may be granted access to read and write data on the server 205.

In one embodiment, the device 115-a may establish a persistent (or long-lived) connection 215 with the server 205. The device 115-a may also send a keep-alive message 220 to maintain the persistent connection 215. In one configuration, the mobile device 115-a may initiate a process to establish the persistent connection 215 over the network 210 between the device 115-a and the server 205. The persistent connection 215 may be a TCP and/or UDP connection.

The device 115-a may create and transmit the keep-alive message 220 before a keep-alive timeout expires in order to maintain the persistent connection 215. The term keep-alive timeout may refer to a maximum amount of time after which a network middlebox may clear the state for a persistent connection between two devices. Without a keep-alive message, the middlebox (e.g., an intermediate NAT-enabled router) may drop a long-lived connection when the keep-alive timeout expires. Different networks may use different keep-alive timeout values. In one embodiment, the mobile device 115-a may learn the value of a keep-alive timeout associated with the network 210.

In one configuration, the network 210 includes a stateful network. A stateful network may be any network that performs stateful packet inspection (SPI) or dynamic packet filtering to track the state of network connections (e.g., TCP streams and/or UDP communication) traveling across it. In a stateful network, when a packet is sent out of a computer in the network, the device 115-a, network 210, and/or server 205 may keep track of each packet. When a packet traverses the network 210, the device 115-a, network 210, and/or server 205 may decipher whether or not an in-bound packet is a reply to a packet that was sent out. Thus, the network 210 may distinguish legitimate packets for different types of connections. The network 210 may allow those packets matching a known active connection (e.g., the persistent connection 215) while others may be rejected.

In some embodiments, the device 115-a may store attributes of the persistent connection 215 in a memory device. Such attributes may be collectively known as the state of the connection, and may include such details as the IP addresses and ports involved in the persistent connection 215 and the sequence numbers of the packets traversing the persistent connection 215. Thus, over time the device 115-a, network 210, and/or server 205 may monitor incoming and outgoing packets traversing the persistent connection 215, as well as the state of the persistent connection 215, and store the data in dynamic state tables that are stored in a memory device. The device 115-a may evaluate this cumulative data to base filtering decisions on context that has been built by previous connections as well as previous packets belonging to the same connection.

In some embodiments, the keep-alive message 220 may originate from a modem processor or an application processor. A keep-alive may be a message sent by the device 115 to another device (such as the server 205) to verify that the persistent connection 215 between the two devices is still alive and/or to prevent the persistent connection 215 from being lost. In one configuration, the keep-alive message may contain null data. In one configuration, the device 115-a may originate multiple persistent connections. Thus, in some embodiments, the device 115-a may generate a number of keep-alive messages for the persistent connections. In some embodiments, the generation and transmission of keep-alive messages for multiple connections may be synchronized.

Figure 3:
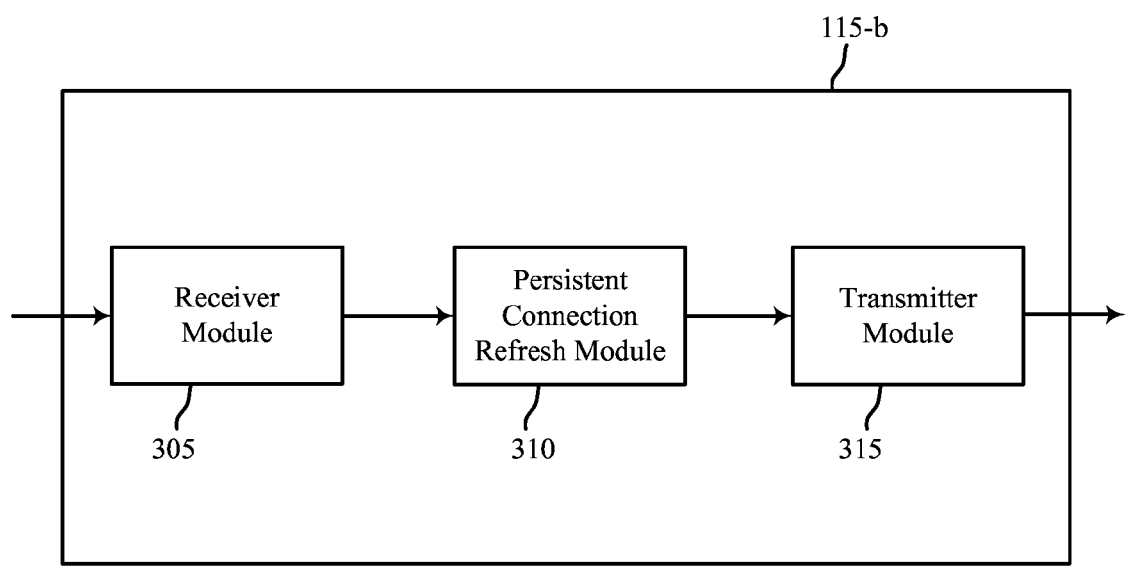
FIG. 3 is a block diagram of an example of a processor, in accordance with the present systems and methods.

FIG. 3 is a block diagram 300 illustrating one embodiment of a mobile device 115-b, in accordance with the present systems and methods. The device 115-b may be an example of the mobile device 115 of FIGS. 1 and/or 2. The mobile device 115-b may include a receiver module 305, a persistent connection refresh module 310, and a transmitter module 315. Each of these components may be in communication with each other.

These components of the device 115-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 305 may include a cellular receiver and may receive responses to requests to connect to a base station 105. The persistent connection refresh module 310 may learn the keep-alive timeout value for a network and generate keep-alive messages for persistent connections (e.g., persistent connection 215 in FIG. 2) using the network according to the learned keep-alive timeout value.

In one configuration, the device 115-b may transmit a request to establish a persistent connection over a particular network via the transmitter module 315. With a persistent connection established, the device 115-b may generate and transmit keep-alive messages to traverse through a network middlebox via the transmitter module 315 in a synchronized fashion. The persistent connection refresh module 310 may transmit multiple keep-alive messages for different connections over a single radio connection established by the transmitter module 315. Details regarding the persistent connection refresh module 310 are described below.

Figure 4:
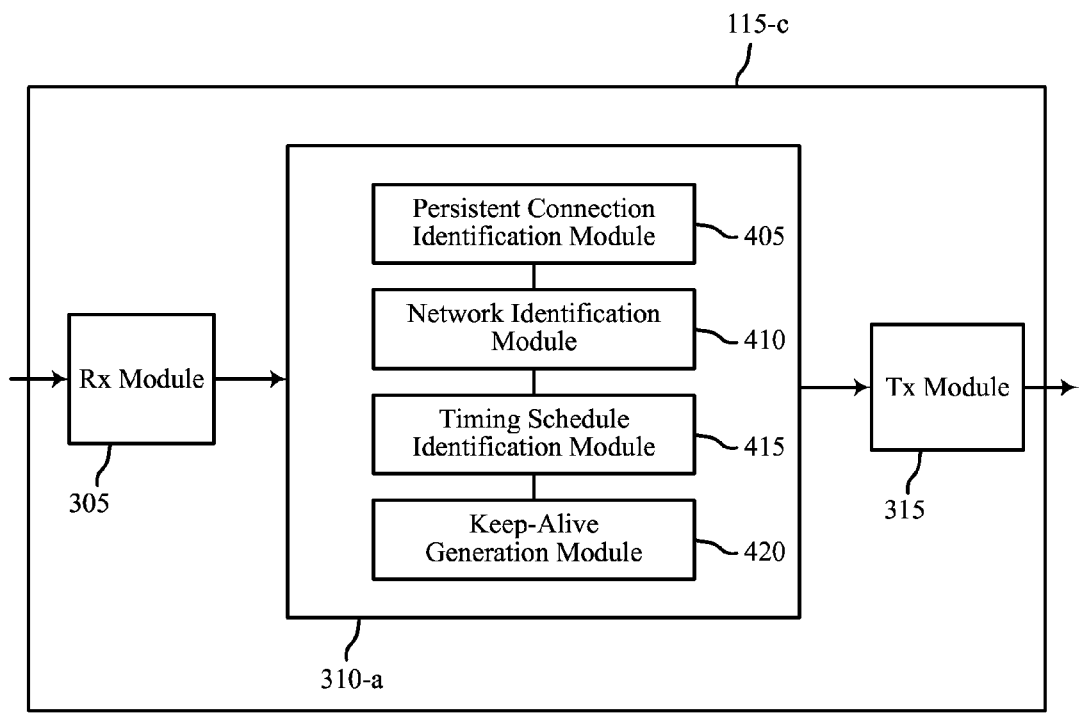
FIG. 4 is a block diagram illustrating one embodiment of a persistent connection refresh module in accordance with the present systems and methods.

FIG. 4 is a block diagram 400 illustrating one embodiment of a persistent connection refresh module 310-a of a mobile device 115-c. The device 115-c may be an example of the mobile device 115 of FIGS. 1, 2, and/or 3. The persistent connection refresh module 310-a may be an example of the persistent connection refresh module 310 described in FIG. 3. The module 310-a may be in communication with a receiver module 305 and a transmitter module 315. In one embodiment, the persistent connection refresh module 310-a may include a persistent connection identification (ID) module 405, a network ID module 410, a timing schedule ID module 415, and a keep-alive generation module 420. Each of these components may be in communication with each other.

These components of the device 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 305 may receive a message in response to a request to establish a persistent connection 215 to a server 205 that was transmitted via the transmitter module 315. The persistent connection ID module 405 may identify a number of persistent connections associated with at least one application on a wireless device in a network hosting the multiple persistent connections. The network ID module 410 may identify a network ID of the network hosting the connections.

The timing schedule ID module 415 may identify a timing schedule specific to the network hosting the connections. For example, the module 415 may identify a timing schedule specific to the network that indicates how often keep-alive messages should be transmitted to refresh persistent connections. The keep-alive generation module 420 may generate a keep-alive message for at least one persistent connection before keep-alive timeout value expires indicated by the identified timing schedule. Details regarding the timing schedule ID module 415 and the keep-alive generation module 420 will be described below.

Figure 5:
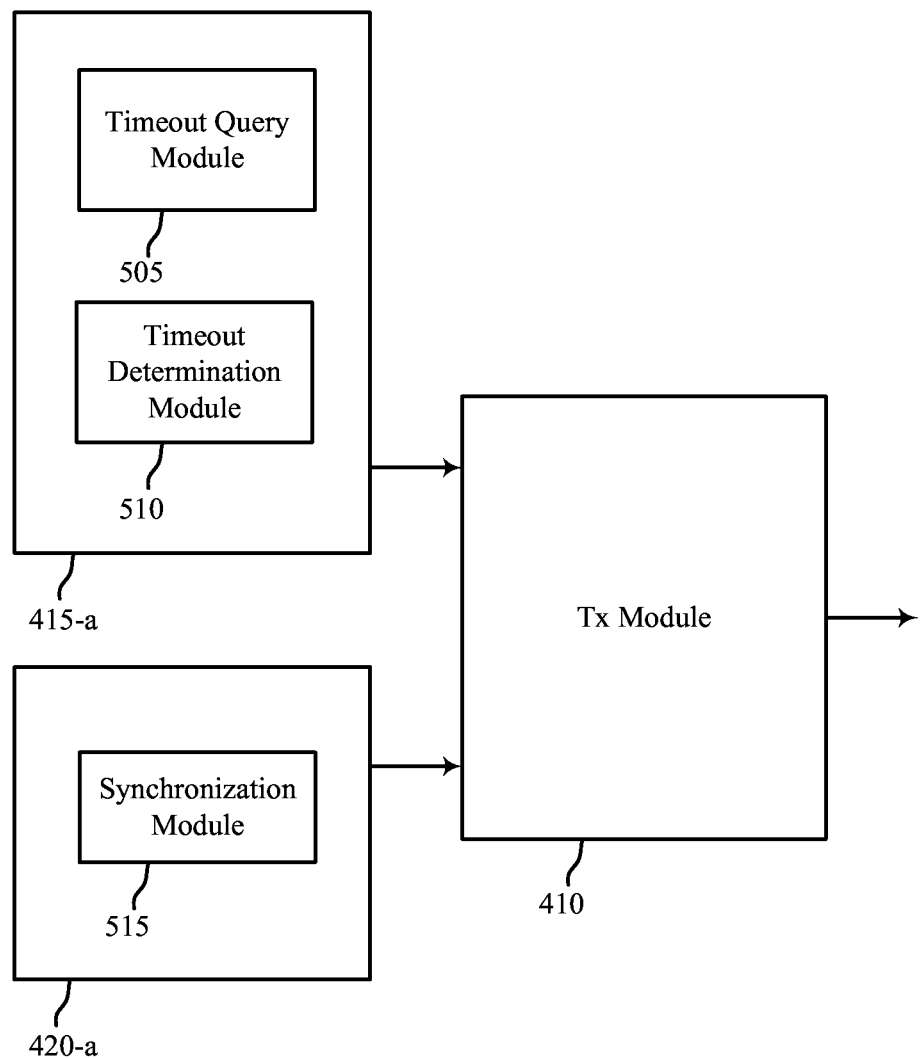
FIG. 5 is a block diagram illustrating one embodiment of various modules of a timing schedule identification module and a keep-alive generation module to determine a keep-alive timeout time period in a wireless communications system.

FIG. 5 is a block diagram 500 illustrating one embodiment of various modules of a timing schedule ID module 415-a and a keep-alive generation module 420-a to determine a keep-alive timeout value for a network and to generate keep-alive messages in accordance with the timeout value. The modules 415-a and 420-a may be examples of the timing schedule ID module 415 and the keep-alive generation module 420 described in relation to FIG. 4. Each of these components may be in communication with each other.

These components may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the timing schedule ID module 415-a may include a timeout query module 505 and a timeout determination module 510. The timeout query module 505 may transmit a query after a predetermined time period to determine whether a persistent connection is available. For example, after a predetermined time period the timeout query module 505 may transmit a query to a server (such as server 205) to determine whether a persistent connection is available. In some embodiments, the timeout determination module 510 may determine whether the timeout information for one or more persistent connections in a network hosting the persistent connection is stored in a central database. In some embodiments, upon determining that the timeout information exists in a central database, the timeout determination module 510 may use this information to identify the timing schedule to transmit the keep-alive messages.

In some embodiments, if keep-alive timeout information for a network is unavailable in a central database, the timeout determination module 510 may learn the timeout information for the network. In one example, the module 510 may establish a test persistent connection with a test device, such as a test server. The timeout query module 505 may transmit a query after a first period of time to determine whether the test connection is still available. If the connection is unavailable (e.g., the connection has terminated), the determination module 510 may establish a second test persistent connection between the mobile device 115 and the test device. The timeout query module 505 may transmit a query after a second time period to determine whether the second persistent connection is available. In one configuration, the second time period may be shorter than the first time period.

In some embodiments, if the timeout determination module 510 determines the first test persistent connection is available after the first time period, the timeout query module 505 may transmit an additional query after a second time period to determine whether the first persistent connection is available. In one configuration, the second time period may be longer than the first time period. In some embodiments, the query to determine whether the first persistent connection is available may originate from a modem processor and/or an application processor of the device 115.

In one configuration, the timeout determination module 510 may estimate the value of the keep-alive timeout using a keep-alive timeout algorithm. The timeout determination module 510 may set a predetermined timing value, Tmax, to be an upper-bound of timeout values. In cooperation with the timeout determination module 510, the algorithm may initialize the keep-alive timing estimate to Tmax. The algorithm may establish a connection with another IP host (e.g., device 115 and/or server 205). After waiting the allotted period of time of the initial keep-alive timing estimate (i.e., Tmax), the algorithm may query the other IP host. If the established connection to the other IP host is still alive, the algorithm may return the current value of the initial keep-alive timing estimate. If the connection to the other IP host is not alive following the query, the algorithm may decrement the initial keep-alive timing estimate by a predetermined timing stepsize. The algorithm may then setup a second connection with the other IP host. The algorithm may then wait a shorter period of time of the updated keep-alive timing estimate before poking the other IP host.

In one example, the keep-alive generation module 420-a may include a synchronization module 515. In one embodiment, the synchronization module 515 may synchronize a generation of the keep-alive messages for each persistent connection of a number of persistent connections based on the timing information determined by the timeout determination module 510. The synchronized generation of the keep-alive messages may occur according to the identified timing schedule of the network hosting the connections. Additional details regarding the synchronized generation of keep-alive messages will be described below.

Figure 6:
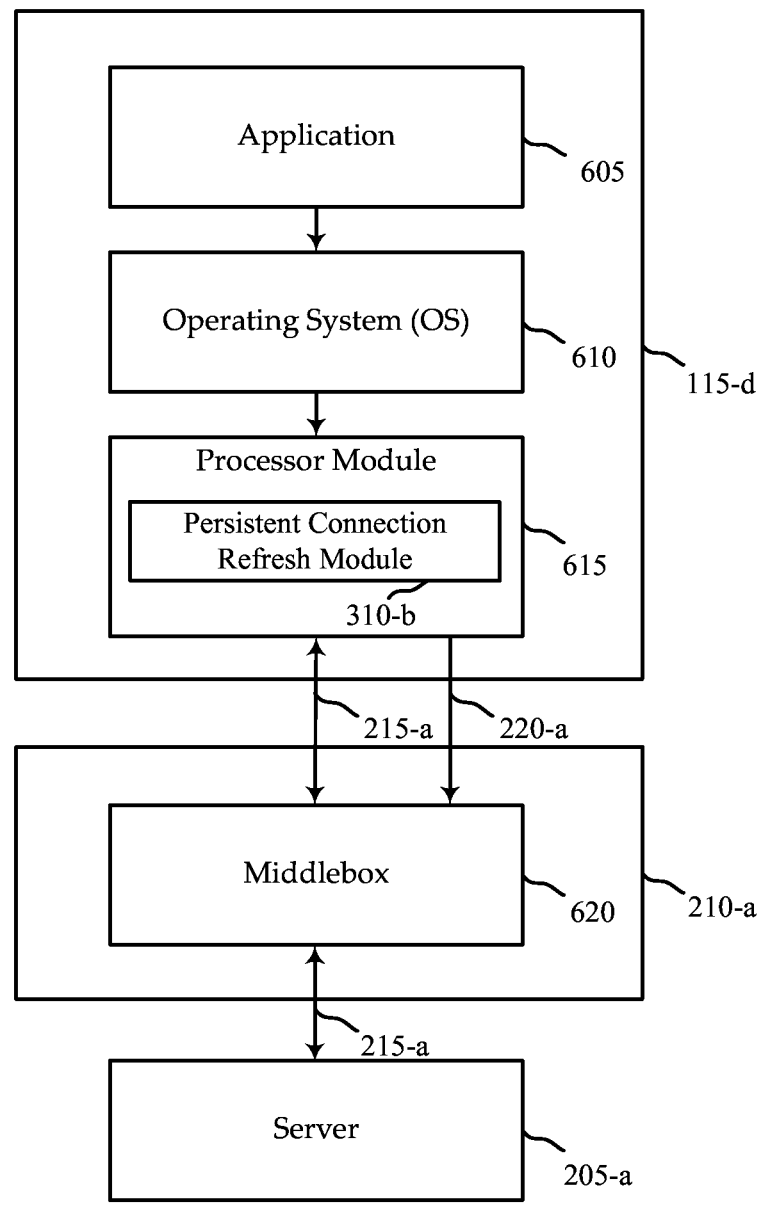
FIG. 6 is a block diagram of an exemplary wireless communications system that includes another example of a device in accordance with the present systems and methods.

FIG. 6 is a block diagram of an exemplary wireless communications system 600 that includes another example of a device 115-d in accordance with the present systems and methods. The device 115-d may be an example of the device 115 depicted in FIGS. 1, 2, 3, and/or 4. The device 115-d may include an application 605, an operating system (OS) 610, and a processor 615. In addition to the device 115-d, the wireless communications system 600 may include a network 210-a and a server 205-a. The network 210-a and server 205-a may be examples of the network 210 and server 205 depicted in FIG. 2. The network 210-a may include a middlebox 620. Each of these components may be in communication with each other.

These components, individually or collectively, may be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the application 605 may initiate a process to establish a persistent connection 215-a with the server 205-a. Examples of applications 605 that may request a persistent connection with the server 205-a may include, but are not limited to, MEEBO®, GOOGLE TALK®, SKYPE®, and the like. The request to establish the connection may pass through the OS 610. The OS 610 may include operating systems such as WINDOWS® and MAC-OS®. Additionally or alternatively, the OS 610 may include a mobile operating system such as ANDROID®, IOS®, BLACKBERRY®, WINDOWS PHONE®, or another similar mobile operating system. The OS 610 may provide a combination of functions and interfaces for the device 115-d. For example, the OS 610 may provide the device 115-d with functions and interfaces for a touchscreen, cellular connectivity, Bluetooth, wireless (Wi-Fi, 802.11), global positioning system (GPS) mobile navigation, camera, video camera, speech recognition, voice recorder, music player, near field communication (NFC), personal digital assistant (PDA), and other similar functions. In one embodiment, the OS 610 may provide an environment for applications, such as the application 605, to execute on the device 115-d.

One example of the processor 615 may include a modem processor. Alternatively, or additionally, one example of the processor 615 may include an application processor. In one configuration, the processor may include a persistent connection refresh module 310-b, which is an example of the persistent connection refresh module 310 illustrated in FIGS. 3 and/or 4. Additionally, or alternatively, the operating system 610 may include at least a portion of the persistent connection refresh module 310-b. In some embodiments, the module 310-b may establish a persistent connection 215-a between the device 115-d and the server 205-a over the network 210-a. In relation to the persistent connection 215-a, the module 310-*b* may generate a keep-alive message 220-*a* and transmit the keep-alive message 220-*a* to the middlebox 620 to maintain the persistent connection 215-*a*. In some embodiments, the module 310-*b* may transmit the keep-alive message 220-*a* to refresh the persistent connection 215-*a*. While a single persistent connection is illustrated, it is to be understood that multiple persistent connections may exist and multiple keep-alive messages may be generated to refresh the persistent connections. The multiple keep-alive messages may be generated in a synchronized manner and transmitted over a single radio connection according to an identified time schedule of the network 210-*a* hosting the connections.

In some embodiments, the module 310-*b* may provide a persistent connection service to the application 605. This service may include coordinating the generation and sending of keep-alive messages according to keep-alive timing schedules for different networks. The application 605 may generate a request (e.g., opening a socket) to the persistent connection refresh module 310-*b*. When the module 310-*b* detects the request, the module 310-*b* may perform the functions of generating keep-alive messages on behalf of the application 605.

In some configurations, the module 310-*b* may learn a keep-alive timing schedule for the network 210-*a*. In one example, the module 310-*b* may set up the persistent connection 215-*a* with the server 205-*a* in the network 210-*a*. The server 205-*a* may respond with information indicating when the module 310-*b* should transmit a query back to the server 205-*a* to verify whether the persistent connection is available. At a suggested time provided by the server 205-*a*, the module 310-*b* may transmit a query on the persistent connection 215-*a* to check whether the connection is still alive. In another example, at the suggested time, the server 205-*a* may transmit a query to the module 310-*b* to verify whether the connection is still alive. If the module 310-*b* determines that the connection is down, the module 310-*b* may establish another persistent connection with the server 205-*a* through the middlebox 620. The module 310-*b* may transmit a query at a time interval that is shorter than the time interval in which the previous query was transmitted. For example, the module 310-*b* may transmit a query 30 minutes after the first persistent connection is established with the server 205-*a*. If the connection is unavailable, the module 310-*b* may establish a second persistent connection and transmit a query after 15 minutes to check whether the second connection is available. If the second connection is available, the module 310-*b* may now wait 20 minutes to transmit another query. This process may continue until the module 310-*b* learns a time interval in which queries can be sent and the connection is still alive. When this time interval is learned, the module 310-*b* may use this time interval as the timing schedule to send keep-alive messages for future persistent connections established in the network 210-*a*.

The module 310-*b* may update a central database with this timing schedule information. For example, the module 310-*b* may transmit the timing schedule information to a crowd-sourcing server, which may then add the information to the central database. The module 310-*b* may also add the information directly to the central database. When additional mobile devices enter the network 210-*a*, they may query the central database directly to discover the timing schedule to transmit keep-alive messages for persistent connections using the network 210-*a*. In another example, the additional mobile devices may transmit an identifier (ID) of the network to the crowd-sourcing server. The crowd-sourcing server may use the network ID to look-up the timing schedule of the network 210-*a* in the central database. The crowd-sourcing server may then return the timing schedule information to the additional mobile devices. By querying the central database, mobile devices may bypass the process of learning the keep-alive timing schedule for the network 210-*a*.

In one configuration, the middlebox 620 may be a computer networking device that transforms, inspects, filters, or otherwise manipulates traffic for purposes other than packet forwarding. Examples of middleboxes may include firewalls, which filter unwanted or malicious traffic, intrusion detection systems, which monitor traffic and collect data for security anomalies, network address translators (NATs), which modify packets source and destination addresses, and wide-area network (WAN) optimizers, which improve bandwidth consumption and perceived latency between dedicated endpoints. NATs are often deployed in cellular and local area networks (LANs) and wireless LANs (WLANs). In one configuration, the middlebox 620 may maintain the state until a timer expires. If the timer expires, the middlebox 620 may clear the state of the persistent connection 215-*a* and the persistent connection 215-*a* may close, as the middlebox 620 may drop packets that do not correspond to any state maintained by the middlebox 620.

In one configuration, the middlebox 620 may be a stateful middlebox. Devices (e.g., device 115-*d* and/or server 205-*a*) communicating over a stateful network (e.g., network 210-*a*) may be separated by stateful middleboxes. In some embodiments, the middlebox 620 may maintain a stateful network connection when either of two or more devices (e.g., the device 115-*d* and the server 205-*a*) transmits a keep-alive message (or other traffic) on a persistent connection 215-*a* before a keep-alive timeout expires.

Figure 7:
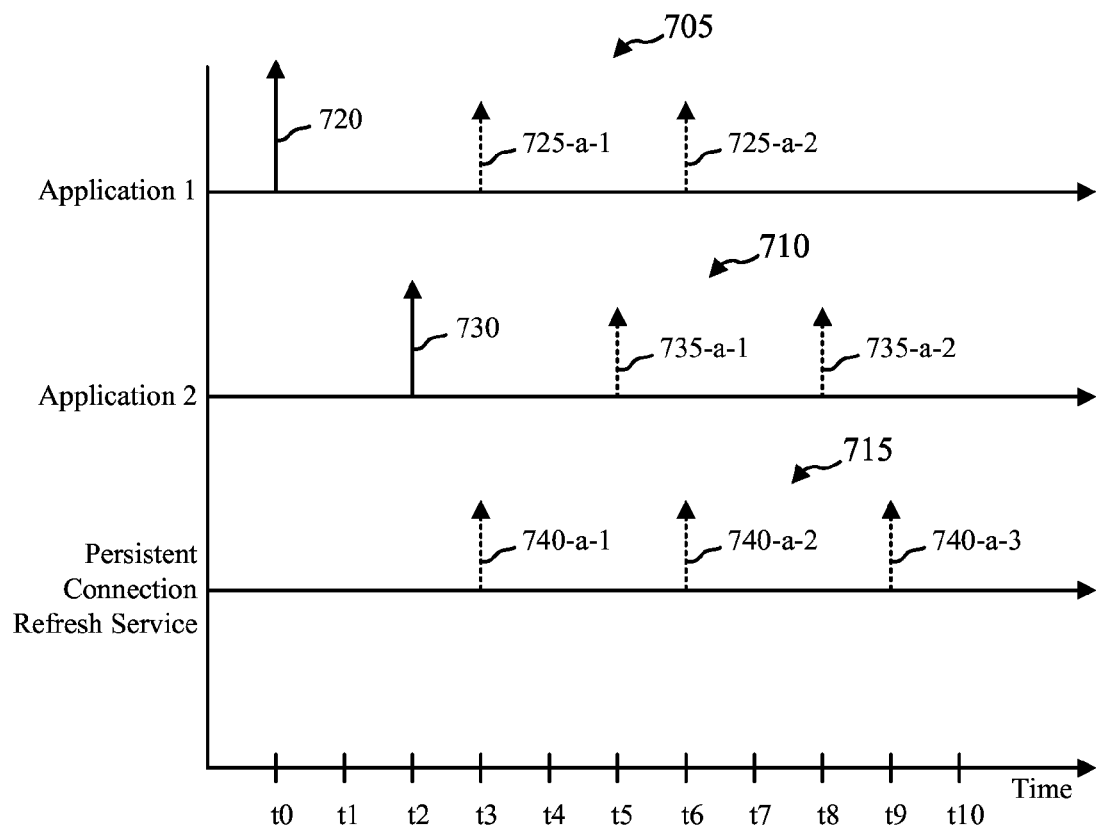
FIG. 7 is a timing diagram for synchronization of keep-alive messages for persistent connections.

FIG. 7 is a timing diagram 700 illustrating the synchronization of keep-alive messages for persistent connections in accordance with the present systems and methods. The timing diagram 700 includes a time signature 705 for application 1, a time signature 710 for application 2, and a time signature 715 for a persistent connection refresh service. Applications 1 and 2 may be examples of the application 605 illustrated in FIG. 6. The persistent connection refresh service may be provided by the persistent connection refresh module 310 described in relation to FIGS. 3, 4, and/or 6. The time signatures 705 and 710 of applications 1 and 2 may occur when the persistent connection services provided by the persistent connection refresh module 310 are not used.

In one example, the time signature of application 1 may include a first persistent connection 720, a first keep-alive message 725-*a*-1, and a second keep-alive message 725-*a*-2. Application 1 may establish the first persistent connection 720 between a device 115 and a server 205 across the network 210. Over time, keep-alive messages 725-*a*-1 and 725-*a*-2 may be sent to the network middlebox 620 to keep the first persistent connection 720 alive.

The time signature 710 of application 2 may include a second persistent connection 730, a third keep-alive message 735-*a*-1, and a fourth keep-alive message 735-*a*-2. Similar with regards to the time signature 705, application 2 may establish the second persistent connection 730 between the same device 115 and server 205 using the network 210. Keep-alive messages 735-*a*-1 and then 735-*a*-2 may be sent to the middlebox 620 to keep the second persistent connection 730 alive. Separate radio connections may be established to transmit the keep-alive messages generated in the time signatures 705 and 710 of applications 1 and 2, respectively. Using separate radio connections to transmit these messages may result in the device 115 experiencing an increase in the battery drain, data usage, and the source of additional traffic over the network 210.

The time signature 715 illustrates the time signature when the services provided by the persistent connection refresh module 310 are used by the applications 1 and 2. The time signature 715 may include a first synchronized keep-alive message 740-a-1, a second synchronized keep-alive message 740-a-2, and a third synchronized keep-alive message 740-a-3. In one embodiment, instead of both applications 1 and 2 generating and sending keep-alive messages 725 and 735, persistent connection refresh service may estimate the value of the keep-alive timeout and send keep-alive messages 740 on behalf of both applications 1 and 2. Thus, in some configurations, a first persistent connection may originate from a first entity (e.g., application 1 and/or 2), and a first keep-alive message to refresh the first persistent connection may originate from a second entity (e.g., the persistent connection refresh module 310). For example, application 1 may establish the first persistent connection 720 at a time t0. Without the use of the persistent connection refresh service, application 1 may generate keep-alive messages 725-a-1 and 725-a-2 at times t3 and t6 according to the timing schedule of the network hosting the first persistent connection 720. Application 1 may then open radio connections to transmit the keep-alives 725 at times t3 and t6. Similarly, application 2 may establish the second persistent connection 730 at time t2. To maintain the second persistent connection 730, application 2 may generate keep-alives 735-a-1 and 735-a-2 and open additional radio connections to transmit the keep-alives at times t5 and t8. Thus, without the use of the persistent connection refresh service, from time t0 to time t8 four radio connections may be established for applications 1 and 2 at times t3, t5, t6, and t8.

Using the persistent connection refresh service provided by the module 310 may reduce the number of radio connections. In this example, by synchronizing the generation and transmission of the keep-alive messages for the first persistent connection 720 and the second persistent connection 730, the number of radio connections may be reduced. In one embodiment, from time t0 to time t8 keep-alives 740 may be generated for the persistent connections of both applications 1 and 2 in a synchronized manner at time t3 and then again at time t6. Thus, using the persistent connection refresh service to generate keep-alive messages on behalf of applications 1 and 2, the number of radio connections is reduced as a single radio connection is established at times t3 and t6 for both applications 1 and 2 to transmit keep-alive messages 740 for both persistent connections 720 and 730.

Figure 8:
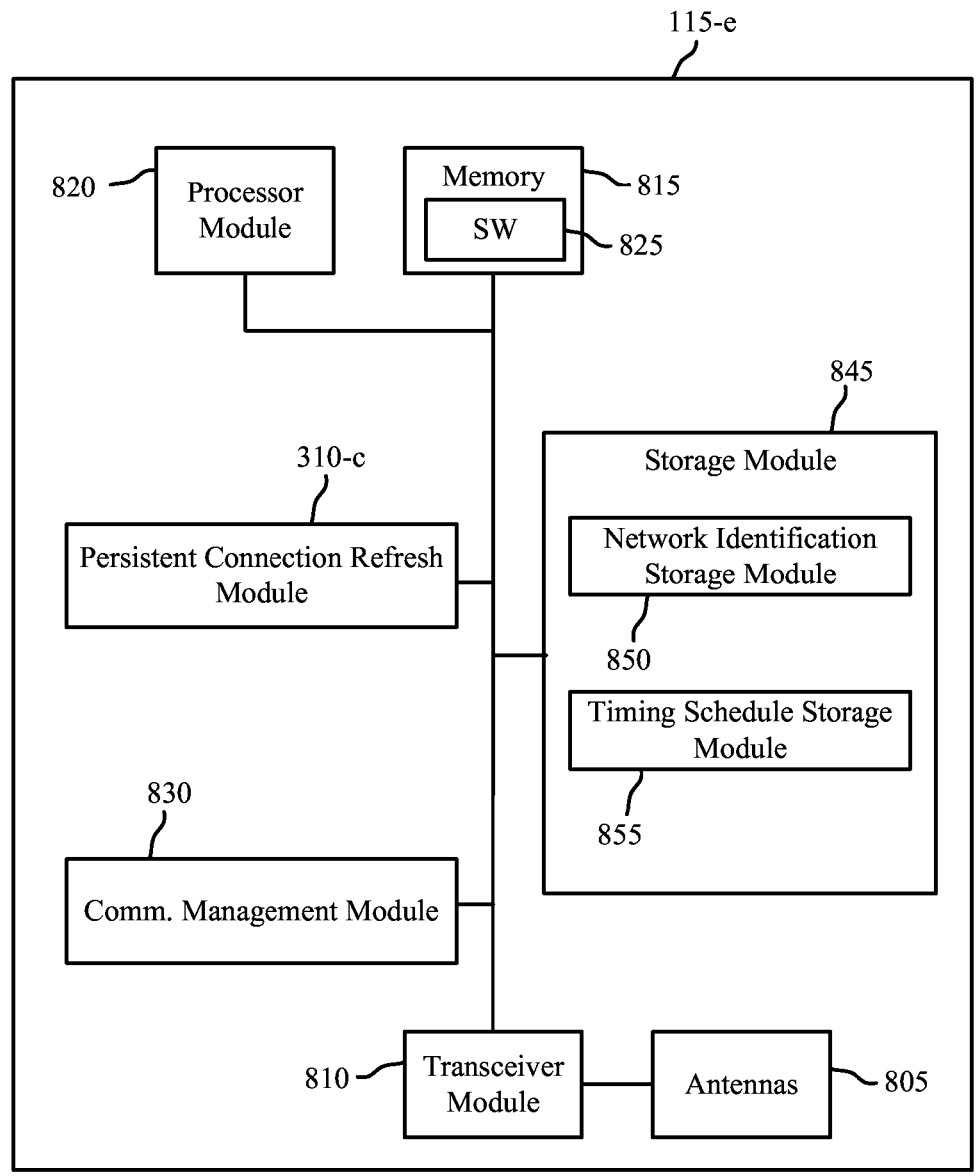
FIG. 8 is a block diagram of a communications system that may be configured for managing keep-alive messages in accordance with various embodiments.

Turning now to FIG. 8, a block diagram 800 illustrates a mobile device 115-e that manages the generation of keep-alive messages in accordance with various embodiments. The mobile device 115-e may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-e may have an internal power supply (not shown), such as a small battery, to facilitate mobile operation. In some embodiments, the mobile device 115-e may be an example of the device 115 of FIGS. 1, 2, 3, 4, and/or 6. The mobile device 115-e may be a multi-mode mobile device. The mobile device 115-e may be referred to as a wireless communications device, user equipment (UE), etc. in some cases.

The mobile device 115-e may include antennas 805, a transceiver module 810, memory 815, and a processor module 820, which each may be in communication, directly or indirectly, with each other (e.g., via one or more buses). The transceiver module 810 is configured to communicate bi-directionally, via the antennas 805 and/or one or more wired or wireless links, with one or more networks, as described above. The transceiver module 810 may include a modem configured to modulate the packets and provide the modulated packets to the antennas 805 for transmission, and to demodulate packets received from the antennas 805. While the mobile device 115-e may include a single antenna, the mobile device 115-e will typically include multiple antennas 805 for multiple links.

The memory 815 may include random access memory (RAM) and read-only memory (ROM). The memory 815 may store computer-readable, computer-executable software code 825 containing instructions that are configured to, when executed, cause the processor module 820 to perform various functions. Alternatively, the software code 825 may not be directly executable by the processor module 820 but be configured to cause the computer (e.g., when compiled and executed) to perform functions described herein.

The processor module 820 may include an intelligent hardware device, e.g., a central processing unit (CPU) such as those made by Intel® Corporation or AMD®, a microcontroller, an application-specific integrated circuit (ASIC), etc. The processor module 820 may include a speech encoder (not shown) configured to receive audio via a microphone, convert the audio into packets (e.g., 30 ms in length) representative of the received audio, provide the audio packets to the transceiver module 810, and provide indications of whether a user is speaking. Alternatively, an encoder may only provide packets to the transceiver module 810, with the provision or withholding/suppression of the packet itself providing the indication of whether a user is speaking.

According to the architecture of FIG. 8, the mobile device 115-e may further include a communications management module 830. The communications management module 830 may manage communications with other mobile devices 115. By way of example, the communications management module 830 may be a component of the mobile device 115-e in communication with some or all of the other components of the mobile device 115-e via a bus. Alternatively, functionality of the communications management module 830 may be implemented as a component of the transceiver module 810, as a computer program product, and/or as one or more controller elements of the processor module 820.

In some embodiments, the mobile device 115-e may optionally include a persistent connection refresh module 310-c, which may be an example of the persistent connection refresh module 310 depicted in FIGS. 3, 4, and/or 6. The components of the module 310-c to implement the present systems and methods may not be repeated here for the sake of brevity.

In some embodiments, the mobile device 115-e may include a storage module 845. In some cases, the storage module 845 in conjunction with the memory 820 may be configured as a central database, providing the mobile device 115-e and other devices a central storage device to post data and query the data posted by devices. The storage module 845 may include a network identification storage module 850 and a timing schedule storage module 855. The timing schedule storage module 855 may store information identifying an identified timing schedule in the memory 820. The network identification storage module 850 may store information identifying a network associated with the identified timing schedule. Thus, the network identification storage module 850 may store an identifier (ID) of the network. The mobile device 115-e may query the storage module 845 for timeout information of persistent connections on the network, established by one or more applications executing on the mobile device 115-e. The query may be based at least in part on the network ID. Identifying the timing schedule to transmit the keep-alive messages to refresh multiple persistent connections may allow the device 115-e to generate synchronized keep-alive message for connections and transmit the keep-alives over a single radio connection.

Figure 9:
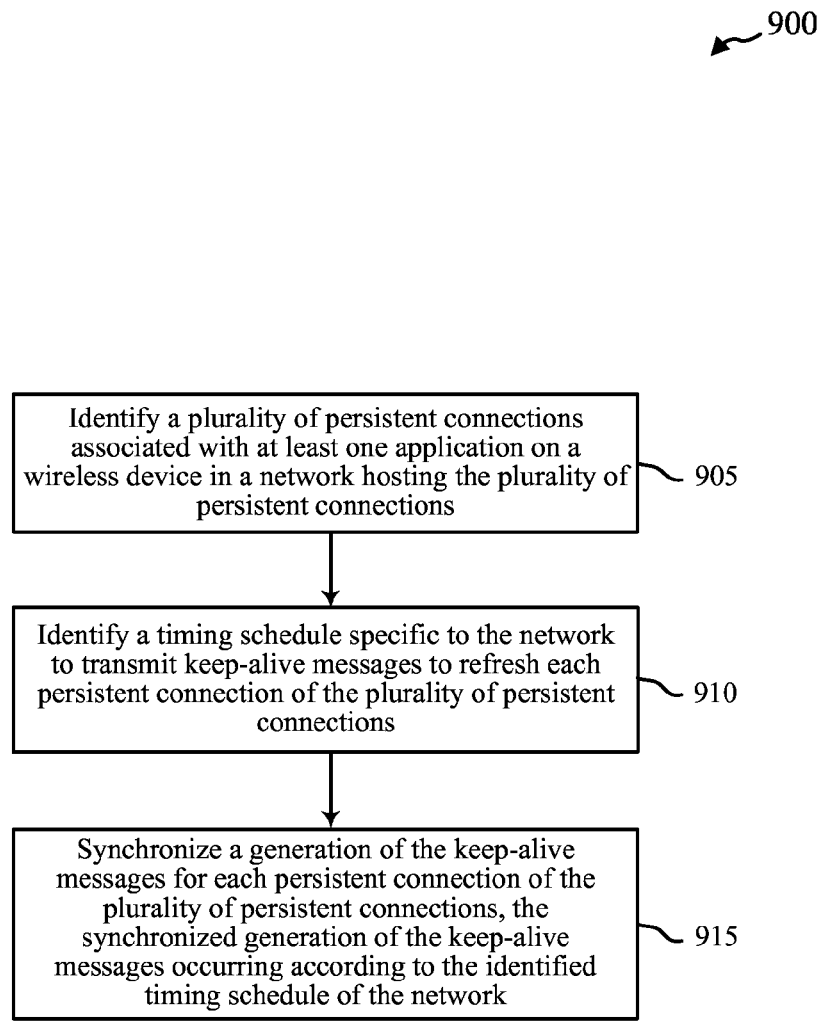
FIG. 9 is a flowchart of a method for synchronizing a generation of keep-alive messages in accordance with various embodiments.

FIG. 9 is a flowchart illustrating one embodiment of a method 900 for synchronizing a generation of keep-alive messages. For clarity, the method 900 is described below with reference to the device 115 of FIGS. 1, 2, 3, 4, 6, and/or 8. In one implementation, the persistent connection refresh module 310 of FIGS. 3, 4, 6, and/or 8 may execute one or more sets of instructions to perform the functions described below.

At block 905, a plurality of persistent connections associated with at least one application on a wireless device may be identified in a network hosting the plurality of persistent connections. At block 910, a timing schedule may be identified specific to the network. Keep-alive messages may be transmitted according to the identified timing schedule to refresh each persistent connection of the plurality of persistent connections.

At block 915, a generation of the keep-alive messages may be synchronized for each persistent connection of the plurality of persistent connections. The synchronized generation of the keep-alive messages may occur according to the identified timing schedule of the network.

Therefore, the method 900 may provide for synchronizing the generation and transmission of keep-alive messages among a plurality of persistent connections. It should be noted that the method 900 is just one implementation and that the operations of the method 900 may be rearranged or otherwise modified such that other implementations are possible.

Figure 10:
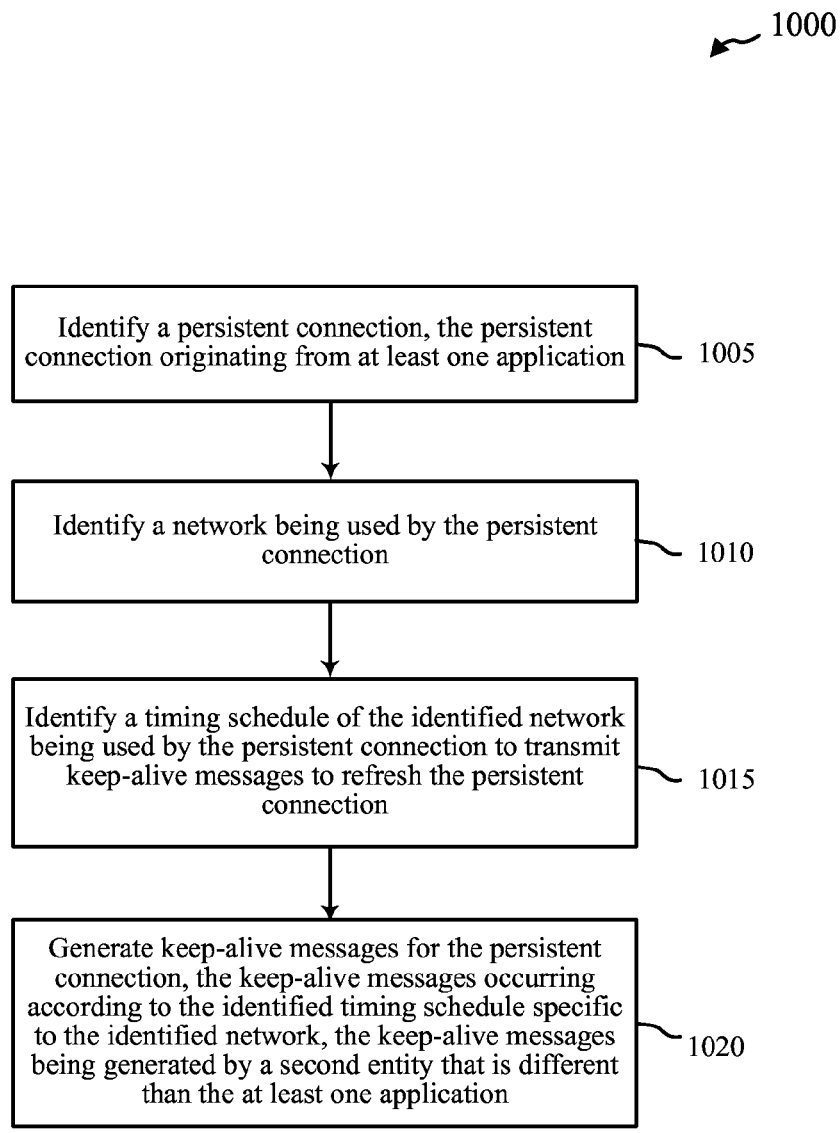
FIG. 10 is a flowchart of a method for generating keep-alive messages for a persistent connection in accordance with the present systems and methods.

FIG. 10 is a flowchart illustrating one example of a method 1000 for generating keep-alive messages for a persistent connection on behalf of an application that originated the persistent connection. For clarity, the method 1000 is described below with reference to the device 115 of FIGS. 1, 2, 3, 4, 6, and/or 8. In one implementation, the persistent connection refresh module 310 of FIGS. 3, 4, 6, and/or 8 may execute one or more sets of instructions to perform the functions described below.

At block 1005, a persistent connection may be identified. The persistent connection may originate from at least one application. At block 1010, a network hosting the persistent connection may be identified. At block 1015, a timing schedule of the identified network hosting the persistent connection may be identified. The timing schedule may be used to transmit keep-alive messages to refresh the persistent connection.

At block 1020, keep-alive messages may be generated for the persistent connection. In one example, the keep-alive messages may be generated and transmitted according to the identified timing schedule of the identified network. In one configuration, the keep-alive messages may be generated by a second entity that is different than the at least one application.

Therefore, the method 1000 may provide for generating keep-alive message for at least one application that originated one or more persistent connections. It should be noted that the method 1000 is just one implementation and that the operations of the method 1000 may be rearranged or otherwise modified such that other implementations are possible.

Figure 11:
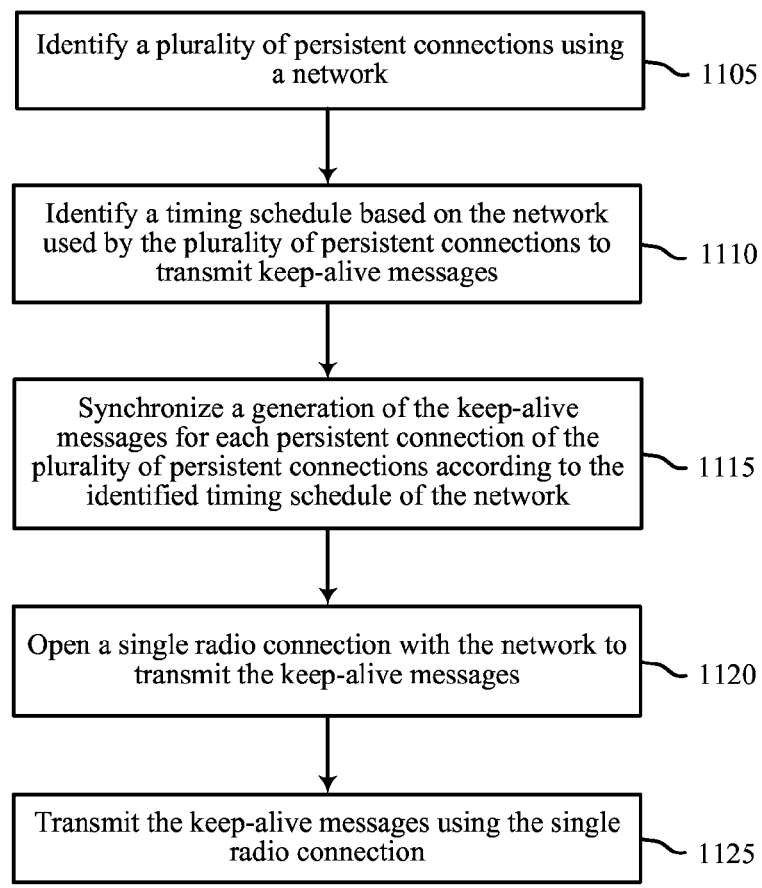
FIG. 11 is a flowchart of a method for transmitting keep-alive messages using a single radio connection in accordance with various embodiments.

FIG. 11 is a flowchart illustrating one configuration of a method 1100 for transmitting keep-alive messages for a plurality of persistent connections using a single radio connection. For clarity, the method 1100 is described below with reference to the device 115 of FIGS. 1, 2, 3, 4, 6, and/or 8. In one implementation, the persistent connection refresh module 310 of FIGS. 3, 4, 6, and/or 8 may execute one or more sets of instructions to perform the functions described below.

At block 1105, a plurality of persistent connections using a network may be identified. The connections may originate from one or more applications. At block 1110, a timing schedule to transmit keep-alive messages for the connections may be identified. At block 1115, a generation of keep-alive messages for the various connections may be synchronized.

At block 1120, a single radio connection may be opened with the network to transmit the keep-alive messages. In one example, a service (provided, for example, by the persistent connection refresh module 310) that is separate and distinct from the one or more applications may be used to generate the keep-alive messages and open a single radio connection to transmit the keep-alive messages. At block 1125, the keep-alive messages may be transmitted using the single radio connection.

Therefore, the method 1100 may provide for transmitting synchronized keep-alive messages for persistent connections using a single radio connection. It should be noted that the method 1100 is just one implementation and that the operations of the method 1100 may be rearranged or otherwise modified such that other implementations are possible.

Figure 12:
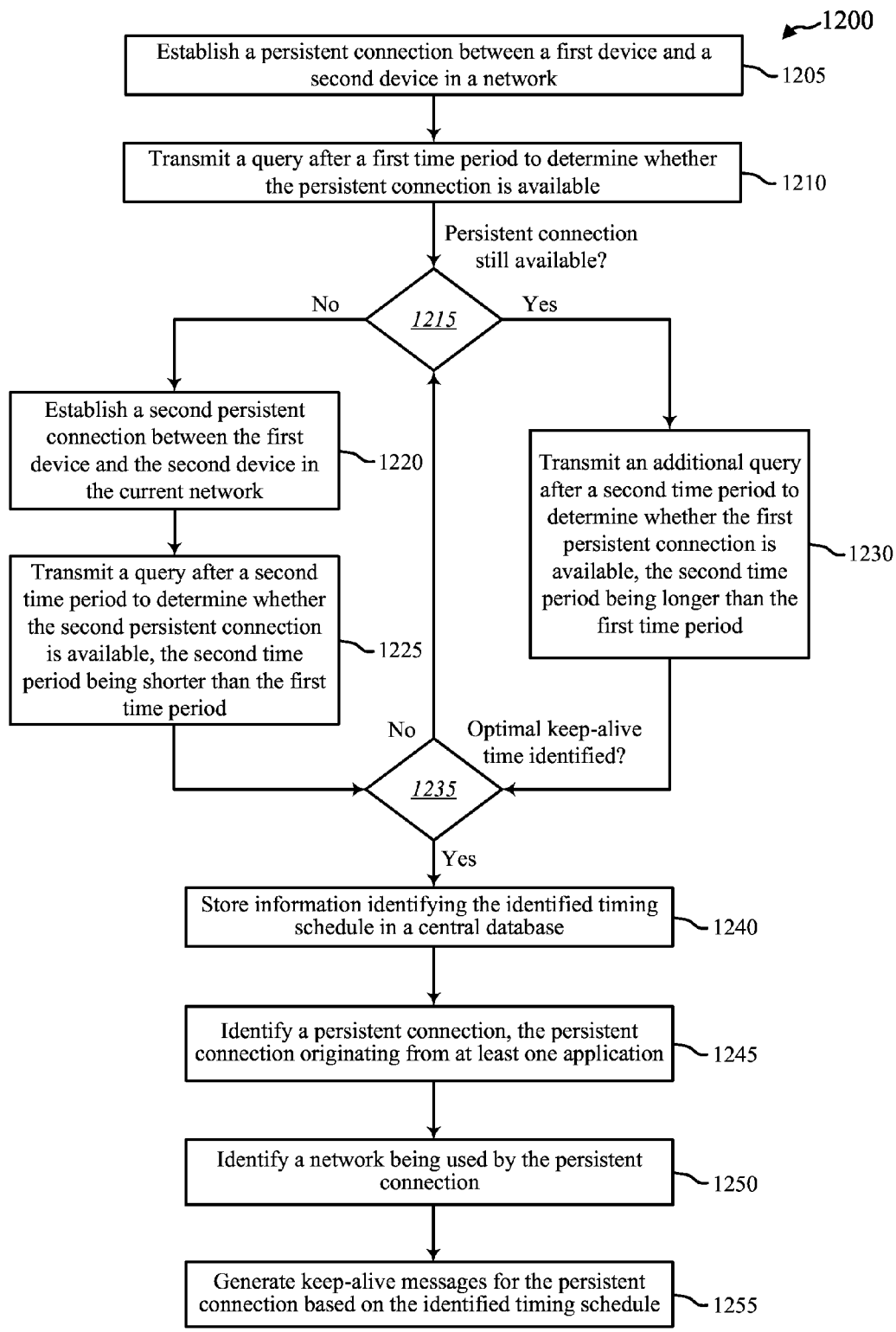
FIG. 12 is a flowchart of a method for determining a timing schedule for keep-alive messages in accordance with the present systems and methods.

FIG. 12 is a flowchart illustrating one embodiment of a method 1200 for determining a timing schedule for keep-alive messages and the generation of the keep-alive messages according to the timing schedule. For clarity, the method 1200 is described below with reference to the device 115 of FIGS. 1, 2, 3, 4, 6, and/or 8. In one implementation, the persistent connection refresh module 310 of FIGS. 3, 4, 6, and/or 8 may execute one or more sets of instructions to perform the functions described below.

At block 1205 a persistent connection between a first device and a second device in a network may be established. At block 1210, a query may be transmitted after a first time period to determine whether the persistent connection is available. At block 1215, it may be determined whether the persistent connection is still available. At block 1220, upon determining that the persistent connection is not available, a second persistent connection may be established between the first device and the second device in the network.

At block 1225, a query may be transmitted after a second time period to determine whether the second persistent connection is available. The second time period may be shorter than the first time period. If it is determines, at block 1230, that the persistent connection is available, an additional query may be transmitted after a second time period to determine whether the first persistent connection is available. The second time period may be longer than the first time period.

At block 1235, it may be determined whether an optimal keep-alive time is identified. If the optimal keep-alive time is not identified the method 1200 may return to block 1215. Otherwise, at block 1240, information identifying the identified timing schedule may be stored in a central database. At block 1245, a persistent connection may be identified. The persistent connection may originate from at least one application. At block 1250, a network hosting the persistent connection may be identified. At block 1255, keep-alive messages may be generated for the persistent connection based on the identified timing schedule previously determined for the network. In some configurations, a plurality of persistent connections may be identified for which keep-alive messages may be generated to keep the plurality of persistent connections alive based on the identified timing schedule previously determined for the network.

Therefore, the method 1200 may provide for determining a timing schedule associated with a persistent connection, storing the determined timing schedule, and generating keep-alive messages based on the determined timing schedule. It should be noted that the method 1200 is just one implementation and that the operations of the method 1200 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method to generate keep-alive messages for a plurality of persistent connections, comprising:

identifying the plurality of persistent connections associated with at least one application on a first wireless device in a network hosting the plurality of persistent connections;
establishing a first test persistent connection between the first wireless device and a second wireless device in the network, wherein the plurality of persistent connections does not include the first test persistent connection;
transmitting a query to determine whether the first test persistent connection is available;
identifying a timing schedule specific to the network to transmit keep-alive messages to refresh each persistent connection of the plurality of persistent connections in the network, the timing schedule based at least in part on the determination as to whether the first test persistent connection is available; and
synchronizing a generation of the keep-alive messages for each persistent connection of the plurality of persistent connections, the synchronized generation of the keep-alive messages occurring according to the identified timing schedule of the network.

2. The method of claim 1, wherein synchronizing the generation of the keep-alive messages comprises:
generating a keep-alive message for at least one persistent connection of the plurality of persistent connections before a time indicated by the identified timing schedule.

3. The method of claim 1, wherein a first persistent connection of the plurality of persistent connections originates from a first entity and a first keep-alive message to refresh the first persistent connection originates from a second entity, the second entity being different from the first entity.

4. The method of claim 1, wherein the query is transmitted after a first time period.

5. The method of claim 4, further comprising:
upon determining the first test persistent connection is unavailable after the first time period, establishing a second test persistent connection between the first device and the second device in the network; and
transmitting an additional query after a second time period to determine whether the second test persistent connection is available, the second time period being shorter than the first time period.

6. The method of claim 4, further comprising:
upon determining the first test persistent connection is available after the first time period, transmitting an additional query after a second time period to determine whether the first test persistent connection is available, the second time period being longer than the first time period.

7. The method of claim 4, wherein the query to determine whether the first test persistent connection is available originates from a modem processor or an application processor.

8. The method of claim 1, wherein identifying the timing schedule comprises:
identifying a network identifier (ID) of the network;
querying a central database for timeout information of the plurality of persistent connections established in the network, the query being based at least in part on the network ID; and
determining whether the timeout information for the plurality of persistent connections in the network exists in the central database.

9. The method of claim 8, further comprising:
upon determining that the timeout information exists in the central database, identifying the timing schedule to transmit the keep-alive messages to refresh the plurality of persistent connections in the network, the timing schedule based at least in part on the timeout information.

10. The method of claim 1, further comprising:
storing information identifying the identified timing schedule in a central database, the information comprising an identifier (ID) of the network.

11. The method of claim 1, further comprising:
transmitting the keep-alive messages to refresh the plurality of persistent connections over a single radio connection according to the identified time schedule.

12. The method of claim 1, wherein the keep-alive messages originate from a modem processor or an application processor.

13. The method of claim 1, wherein the network comprises a wireless local area network (WLAN) or a cellular network.

14. The method of claim 1, wherein a persistent connection of the plurality of persistent connections comprises a transmission control protocol (TCP) connection or a user datagram protocol (UDP) connection.

15. A wireless device configured to generate keep-alive messages for a plurality of persistent connections, comprising:
a processor;
memory in electronic communication with the process; and
instructions stored in the memory, the instructions being executable by the processor to:
identify the plurality of persistent connections associated with at least one application on a first wireless device in a network hosting the plurality of persistent connections;
establish a first test persistent connection between the first wireless device and a second wireless device in the network, wherein the plurality of persistent connections does not include the first test persistent connection;
transmit a query to determine whether the first test persistent connection is available;
identify a timing schedule specific to the network to transmit keep-alive messages to refresh each persistent connection of the plurality of persistent connections in the network, the timing schedule based at least in part on the determination as to whether the first test persistent connection is available; and
synchronize a generation of the keep-alive messages for each persistent connection of the plurality of persistent connections, the synchronized generation of the keep-alive messages occurring according to the identified timing schedule of the network.

16. The wireless device of claim 15, wherein the instructions to synchronize the generation of the keep-alive messages are executable by the processor to:
generate a keep-alive message for at least one persistent connection of the plurality of persistent connections before a time indicated by the identified timing schedule.

17. The wireless device of claim 15, wherein a first persistent connection of the plurality of persistent connections originates from a first entity and a first keep-alive message to refresh the first persistent connection originates from a second entity, the second entity being different from the first entity.

18. The wireless device of claim 15, wherein the query is transmitted after a first time period.

19. The wireless device of claim 18, wherein the instructions are executable by the processor to:

upon determining the first test persistent connection is unavailable after the first time period, establish a second test persistent connection between the first device and the second device in the network; and transmit an additional query after a second time period to determine whether the second test persistent connection is available, the second time period being shorter than the first time period.

20. The wireless device of claim 18, wherein the instructions are executable by the processor to:

upon determining the first test persistent connection is available after the first time period, transmit an additional query after a second time period to determine whether the first test persistent connection is available, the second time period being longer than the first time period.

21. The wireless device of claim 18, wherein the query to determine whether the first test persistent connection is available originates from a modem processor or an application processor.

22. The wireless device of claim 15, wherein the instructions to synchronize the generation of the keep-alive messages are executable by the processor to:

identify a network identifier (ID) of the network;

query a central database for timeout information of the plurality of persistent connections established in the network, the query being based at least in part on the network ID; and determine whether the timeout information for the plurality of persistent connections in the network exists in the central database.

23. The wireless device of claim 22, wherein the instructions are executable by the processor to:

upon determining that the timeout information exists in the central database, identify the timing schedule to transmit the keep-alive messages to refresh the plurality of persistent connections in the network, the timing schedule based at least in part on the timeout information.

24. The wireless device of claim 15, wherein the instructions are executable by the processor to:

store information identifying the identified timing schedule in a central database, the information comprising an identifier (ID) of the network.

25. The wireless device of claim 15, wherein the instructions are executable by the processor to:

transmit the keep-alive messages to refresh the plurality of persistent connections over a single radio connection according to the identified time schedule.

26. The wireless device of claim 15, wherein the keep-alive messages originate from a modem processor or an application processor.

27. The wireless device of claim 15, wherein the network comprises a wireless local area network (WLAN) or a cellular network.

28. The wireless device of claim 15, wherein a persistent connection of the plurality of persistent connections comprises a transmission control protocol (TCP) connection or a user datagram protocol (UDP) connection.

29. An apparatus to generate keep-alive messages for a plurality of persistent connections, comprising:

means for identifying the plurality of persistent connections associated with at least one application on a first wireless device in a network hosting the plurality of persistent connections;

means for establishing a first test persistent connection between the first wireless device and a second wireless device in the network, wherein the plurality of persistent connections does not include the first test persistent connection;

means for transmitting a query to determine whether the first test persistent connection is available;

means for identifying a timing schedule specific to the network to transmit keep-alive messages to refresh each persistent connection of the plurality of persistent connections in the network, the timing schedule based at least in part on the determination as to whether the first test persistent connection is available; and means for synchronizing a generation of the keep-alive messages for each persistent connection of the plurality of persistent connections, the synchronized generation of the keep-alive messages occurring according to the identified timing schedule of the network.

30. The apparatus of claim 29, wherein the means for synchronizing the generation of the keep-alive messages comprises:

means for generating a keep-alive message for at least one persistent connection of the plurality of persistent connections before a time indicated by the identified timing schedule.

31. The apparatus of claim 29, wherein the means for transmitting query comprises:

means for transmitting the query after a first time period.

32. The apparatus of claim 31, further comprising:

upon determining the first test persistent connection is unavailable after the first time period, means for establishing a second test persistent connection between the first device and the second device in the network and means for transmitting an additional query after a second time period to determine whether the second test persistent connection is available, the second time period being shorter than the first time period; and upon determining the first test persistent connection is available after the first time period, means for transmitting the additional query after a second time period to determine whether the first test persistent connection is available, the second time period being longer than the first time period.

33. The apparatus of claim 29, wherein the means for identifying the timing schedule comprises:

means for identifying a network identifier (ID) of the network;

means for querying a central database for timeout information of the plurality of persistent connections established in the network, the query being based at least in part on the network ID;

means for determining whether the timeout information for the plurality of persistent connections in the network exists in the central database; and upon determining that the timeout information exists in the central database, means for identifying the timing schedule to transmit the keep-alive messages to refresh the plurality of persistent connections in the network, the timing schedule based at least in part on the timeout information.

34. The apparatus of claim 29, further comprising:

means for storing information identifying the identified timing schedule in a central database, the information comprising an identifier (ID) of the network.

35. The apparatus of claim 29, further comprising:

means for transmitting the keep-alive messages to refresh the plurality of persistent connections over a single radio connection according to the identified time schedule.

36. A computer program product for generating keep-alive messages for a plurality of persistent connections, the computer program product comprising a non-transitory computer-readable medium storing instructions executable by a processor to:
- identify the plurality of persistent connections associated with at least one application on a first wireless device in a network hosting the plurality of persistent connections;
- establish a first test persistent connection between the first wireless device and a second wireless device in the network, wherein the plurality of persistent connections does not include the first test persistent connection;
- transmit a query to determine whether the first test persistent connection is available;
- identify a timing schedule specific to the network to transmit keep-alive messages to refresh each persistent connection of the plurality of persistent connections in the network, the timing schedule based at least in part on the determination as to whether the first test persistent connection is available; and
- synchronize a generation of the keep-alive messages for each persistent connection of the plurality of persistent connections, the synchronized generation of the keep-alive messages occurring according to the identified timing schedule of the network.

37. The computer program product of claim 36, wherein the query is transmitted after a first time period.

38. The computer program product of claim 37, wherein the instructions are executable by the processor to:
- upon determining the first test persistent connection is unavailable after the first time period, establish a second test persistent connection between the first device and the second device in the network and transmit an additional query after a second time period to determine whether the second test persistent connection is available, the second time period being shorter than the first time period; and
- upon determining the first test persistent connection is available after the first time period, transmit the additional query after a second time period to determine whether the first test persistent connection is available, the second time period being longer than the first time period.

39. The computer program product of claim 36, wherein the instructions are executable by the processor to:
- store information identifying the identified timing schedule in a central database, the information comprising an identifier (ID) of the network; and
- transmit the keep-alive messages to refresh the plurality of persistent connections over a single radio connection according to the identified time schedule.

* * * * *